(12) United States Patent
Li et al.

(10) Patent No.: US 12,187,166 B2
(45) Date of Patent: Jan. 7, 2025

(54) SLIDING RAIL TRANSMISSION DEVICE AND VEHICLE

(71) Applicant: HUBEI HAPM MAGNA SEATING SYSTEMS CO., LTD, Hubei (CN)

(72) Inventors: Yuanlin Li, Xiangyang (CN); Yuanhe Gao, Xiangyang (CN); Renlei Xu, Xiangyang (CN); Xiukong Wang, Xiangyang (CN); Yanzhe Shi, Xiangyang (CN)

(73) Assignee: HUBEI HAPM MAGNA SEATING SYSTEMS CO., LTD, Xiangyang (CN)

( * ) Notice: Subject to any disclaimer, the term of this patent is extended or adjusted under 35 U.S.C. 154(b) by 336 days.

(21) Appl. No.: 17/792,047

(22) PCT Filed: Apr. 14, 2022

(86) PCT No.: PCT/CN2022/086803
§ 371 (c)(1),
(2) Date: Jul. 11, 2022

(87) PCT Pub. No.: WO2023/173524
PCT Pub. Date: Sep. 21, 2023

(65) Prior Publication Data
US 2023/0294565 A1   Sep. 21, 2023

(30) Foreign Application Priority Data
Mar. 18, 2022 (CN) .......................... 202210270334.5

(51) Int. Cl.
*B60N 2/02* (2006.01)
*B60N 2/07* (2006.01)
*B60N 2/06* (2006.01)

(52) U.S. Cl.
CPC ....... *B60N 2/02246* (2023.08); *B60N 2/0705* (2013.01); *B60N 2/02253* (2023.08);
(Continued)

(58) Field of Classification Search
CPC .............. B60N 2/02246; B60N 2/0705; B60N 2/02253; B60N 2205/20; B60N 2/065; B60N 2/0715; B60N 2/06; Y02E 10/50
(Continued)

(56) References Cited

U.S. PATENT DOCUMENTS 9,586,500 B2 * 3/2017 Shimizu ............... B60N 2/0705

FOREIGN PATENT DOCUMENTS

| CN | 110641322 A | 1/2020 |
| CN | 210062732 U | 2/2020 |

(Continued)

OTHER PUBLICATIONS

European Patent Office, Extended European Search Report Issued in Application No. 22731462.2, Jul. 31, 2024, Germany, 5 pages.
(Continued)

*Primary Examiner* — Joseph D. Pape
*Assistant Examiner* — Dana D Ivey
(74) *Attorney, Agent, or Firm* — Kilpatrick Townsend & Stockton LLP

(57) ABSTRACT

A sliding rail transmission device includes a driving portion and at least one sliding rail assembly, the sliding rail assembly includes a rail and a movable member, the rail is provided with a flanging, the flanging forms a first transmission toothed belt, and the rail is provided with a damping strip at a position of the first transmission toothed belt, the damping strip forms a second transmission toothed belt, the first transmission toothed belt and the second transmission toothed belt are arranged side by side, the movable member is provided with a transmission gear, the transmission gear is arranged below the first transmission toothed belt and the second transmission toothed belt, and the transmission gear can mesh with the first transmission toothed belt and the second transmission toothed belt simultaneously; and the
(Continued)

driving portion drives the transmission gear to rotate to drive the movable member to move along the rail.

20 Claims, 7 Drawing Sheets

(52) U.S. Cl.
CPC ............... *B60N 2/06* (2013.01); *B60N 2/065* (2013.01); *B60N 2/067* (2013.01); *B60N 2/0715* (2013.01); *B60N 2205/20* (2013.01); *Y02E 10/50* (2013.01)

(58) Field of Classification Search
USPC .......................................... 296/65.13, 65.15
See application file for complete search history.

(56) References Cited

FOREIGN PATENT DOCUMENTS

| | | | |
|---|---|---|---|
| CN | 111775785 A | * | 10/2020 |
| EP | 0416303 A2 | | 3/1991 |
| JP | 2008265735 A | | 11/2008 |
| JP | 2019119386 A | | 7/2019 |
| WO | 2013146774 A1 | | 10/2013 |

OTHER PUBLICATIONS

ISA State Intellectual Property Office of the People's Republic of China, International Search Report and written opinion Issued in Application No. PCT/CN2022/086803, Dec. 26, 2022, WIPO, 9 pages.

\* cited by examiner

SLIDING RAIL TRANSMISSION DEVICE AND VEHICLE

This application is a 35 U.S.C. 371 Patent Application of PCT Application No. PCT/CN2022/086803, filed on Apr. 14, 2022, which claims the priority to Chinese Patent Application No. 202210270334.5, titled "SLIDING RAIL TRANSMISSION DEVICE AND VEHICLE", filed with the China National Intellectual Property Administration on Mar. 18, 2022, each of which is hereby incorporated by reference in its entirety.

FIELD

The present application relates to the technical field of vehicles, and in particular to a sliding rail transmission device and a vehicle.

BACKGROUND

A seat of a car can be moved by the movement of a sliding rail, so as to meet different space requirements. For example, with the continuous improvement of requirements of people for the comfort and space of passenger cars, a MPV model is gradually favored by people. More and more models are equipped with long sliding rails to meet the front and rear sliding requirements of seats in a second row and a third row, so as to release more space. Therefore, it is necessary to provide a reliable sliding rail transmission device to adjust the front and rear distance of the seat.

SUMMARY

A sliding rail transmission device is provided according to an embodiment of the present application, which includes a driving portion and at least one sliding rail assembly, the sliding rail assembly includes a rail and a movable member, the rail is provided with a flanging which extends downward, the flanging forms a first transmission toothed belt, and the rail is provided with a damping strip at a position of the first transmission toothed belt, the damping strip forms a second transmission toothed belt, the first transmission toothed belt and the second transmission toothed belt are arranged side by side, the movable member is provided with a transmission gear, the transmission gear is arranged below the first transmission toothed belt and the second transmission toothed belt, and the transmission gear meshes with the first transmission toothed belt and the second transmission toothed belt simultaneously; and the driving portion drives the transmission gear to rotate to drive the movable member to move along the rail.

In a specific embodiment, the rail is provided with the flanging which extends downward, and the first transmission toothed belt is integrally formed on the flanging.

In a specific embodiment, a groove is defined in the rail, the groove includes a bottom wall and side walls located on two sides of the bottom wall, and a top of at least one of the side walls extends inward and downward to form the flanging.

In a specific embodiment, at least part of the movable member is inserted into the groove and is configured to move along the bottom wall of the groove.

In a specific embodiment, the second transmission toothed belt is located on an inner side of the flanging.

In a specific embodiment, the second transmission toothed belt is made of plastic.

In a specific embodiment, a rolling bearing is provided on one side or two sides of the movable member, the movable member is supported on the rail through the rolling bearing, and the movable member rolls through the rolling bearing to move relative to the rail.

In a specific embodiment, two clearance elimination bearings are provided on two sides of the rail, the two clearance elimination bearings are in contact with the rail, contact positions are located above a supporting position of the movable member, the two clearance elimination bearings are inclined relative to an up-down direction, and the two clearance elimination bearings on the two sides are arranged symmetrically relative to the up-down direction; a groove is defined in the rail, the groove includes a bottom wall and side walls located on two sides of the bottom wall, tops of the side walls extend inward to form the top wall, the top wall and each side wall is connected by an arc surface, and the two clearance elimination bearings are in contact with the arc surface and are rollable along the arc surface.

In a specific embodiment, the sliding transmission device includes two sliding rail assemblies arranged side by side, the movable member of each sliding rail assembly includes a gear box, the gear box includes an input gear and an output gear, the output gear is coaxially connected to the transmission gear, and the input gear includes a first shaft hole; the driving portion includes a motor and a transmission rod, the motor drives the transmission rod to rotate, and the transmission rod is inserted to two first shaft holes of the input gears of the two gear boxes simultaneously to drive two input gears to rotate synchronously.

In a specific embodiment, the output gear is provided with a gear shaft, the gear shaft protrudes out of a housing of the gear box, the transmission gear includes a second shaft hole, the gear shaft is inserted into the second shaft hole and circumferentially limits rotation; the sliding transmission device further includes an axial limiting member, the gear shaft passes through the second shaft hole and is connected to the axial limiting member, and the axial limiting member limits the transmission gear from being axially separated from the gear shaft.

In a specific embodiment, the sliding transmission device further includes a bracket, the movable members of the two sliding rail assemblies are connected by the bracket, and the motor is arranged on the bracket.

In a specific embodiment, the movable member defines an accommodating portion, part of the gear box is located in the accommodating portion, another part of the gear box protrudes upward out from the movable member, the second shaft hole of the input gear is located above the movable member, and two ends of the transmission rod are inserted into the two second shaft holes respectively.

In a specific embodiment, a vehicle is provided according to an embodiment of the present application, which includes a seat, and further includes the sliding transmission device according to any one of the above, and the movable member is connected to the seat.

In this embodiment, a moving cooperation mode of the rail and the movable member, and a driving mode of the transmission gear with the first transmission toothed belt and the second transmission toothed belt are beneficial to realizing stable driving, especially realizing the driving under long-distance travel adjustment. In addition, the transmission gear is located below the first transmission toothed belt and the second transmission toothed belt, so that foreign matters are not easy to fall into the first transmission toothed belt and the second transmission toothed belt with such arrangement, which can improve or even prevent the foreign matters from falling into the first transmission toothed belt and the second transmission toothed belt and affecting the meshing of the transmission gear with the first transmission toothed belt and the second transmission toothed belt, and can ensure driving effect. More importantly, the first transmission toothed belt and the second transmission toothed belt which is used as the damping member are arranged side by side and mesh with the transmission gear together, which not only ensures the overall strength of the transmission toothed belts, but also achieves the object of vibration damping, and is beneficial to enhancing the adaption of tolerance.

Figure 1:
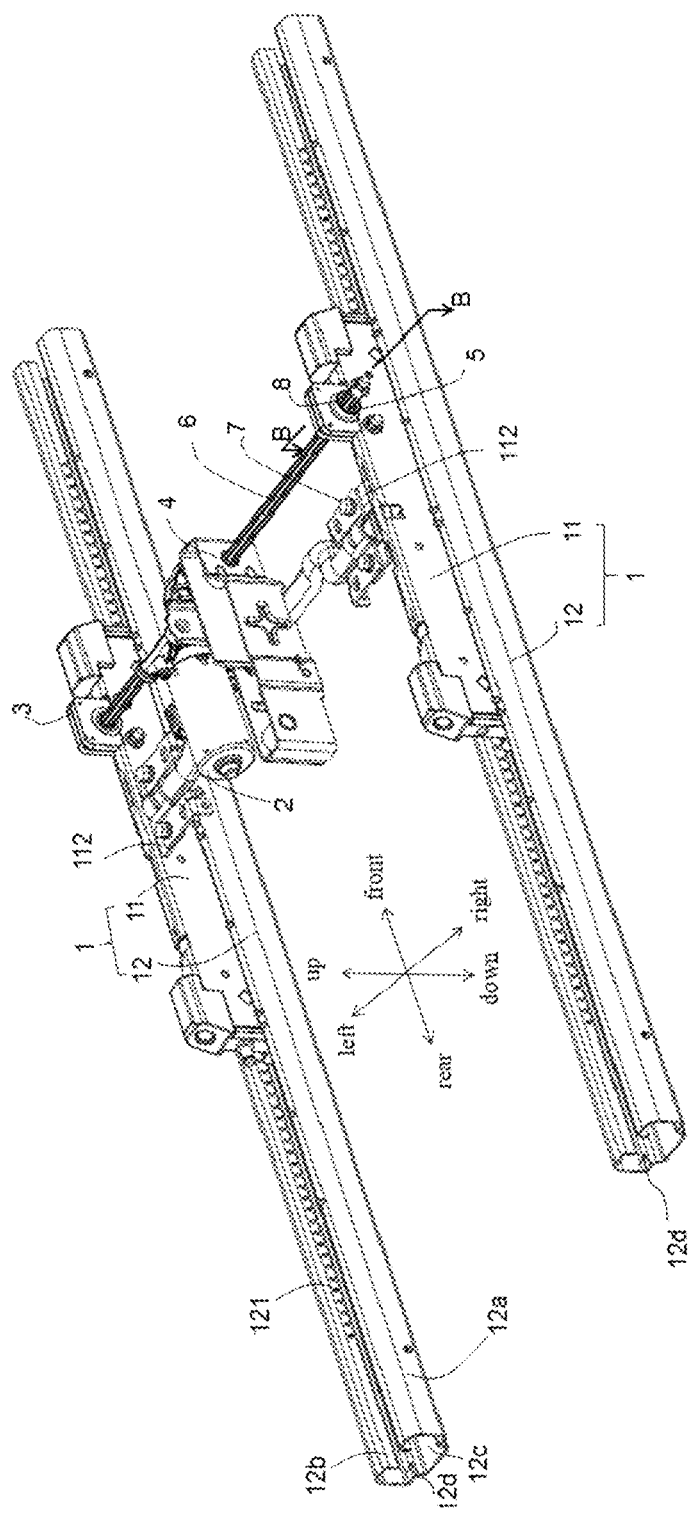
FIG. 1 is a schematic structural view of a sliding rail transmission device provided according to an embodiment of the present application.

THE REFERENCE NUMERALS IN FIGS. 1 TO 7 ARE AS FOLLOWS 1, sliding rail assembly;
111, rolling bearing;
113, clearance elimination bearing;
12a, side wall;
12c, bottom wall;
121, first transmission toothed belt;
122, damping strip;
1221a, gear tooth;
2, motor;
31, first housing assembly;
11, movable member;
112, fixing plate;
12, rail;
12b, flanging;
12d, groove;
121a, gear tooth;
1221, second transmission toothed belt;
1222, fastener;
3, gear box;
311, first housing;
312, first shaft sleeve;
314, third shaft sleeve;
322, fourth shaft sleeve;
33a, boss;
34, intermediate gear;
35, input gear;
35b, boss;
35d, threaded section;
37, axial limiting member;
39, pin;
5, limiting spring clip;
7, screw;
9, bolt;
313, second shaft sleeve;
32, second housing assembly;
33, input gear;
33b, special-shaped hole;
34a, boss;
35a, boss;
35c, special-shaped section;
36, transmission gear;
38, screw;
4, bracket;
6, transmission rod;
8, gasket;
10, nut.

DETAILED DESCRIPTION OF THE EMBODIMENTS

In order to enable those skilled in the art to better understand the technical solutions of the present application, the present application will be further described in detail with reference to the drawings and specific embodiments.

Referring to FIG. 1, FIG. 1 is a schematic structural view of a sliding rail transmission device provided according to an embodiment of the present application.

The sliding rail transmission device according to this embodiment includes a driving portion and at least one sliding rail assembly 1. FIG. 1 includes two sliding rail assemblies 1 arranged side by side, which are the sliding rail assembly 1 on a left side and the sliding rail assembly 1 on a right side. Each sliding rail assembly 1 includes a rail 12 and a movable member 11, the movable member 11 is configured to move along the rail 12, and an extending direction of the rail 12 and a moving direction of the movable member 11 are a front-rear direction shown in FIG. 1. A left-right direction is perpendicular to the front-rear direction, the front-rear direction and the left-right direction are perpendicular to an up-down direction shown in FIG. 1, and the up-down direction shown in FIG. 1 is a vertical direction. Apparently, the up-down direction is not necessarily the vertical direction when the sliding rail transmission device changes by a placement angle, and a perspective in FIG. 1 is also in a normal working state of the sliding rail transmission device.

In addition, the rail 12 is provided with a first transmission toothed belt 121 and a second transmission toothed belt 1221 which is formed by a damping strip 122, the first transmission toothed belt 121 and the second transmission toothed belt 1221 are arranged side by side, the movable member 11 is provided with a transmission gear 36, the transmission gear 36 is located below the first transmission toothed belt 121 and the second transmission toothed belt 1221, and the transmission gear 36 meshes with the first transmission toothed belt 121 and the second transmission toothed belt 1221 simultaneously; the driving portion can drive the transmission gear 36 to rotate, the transmission gear 36 rotates to move relative to the first transmission toothed belt 121 and the second transmission toothed belt 1221 along the front-rear direction, so as to further drive the movable member 11 to move along the rail 12.

Figure 2:
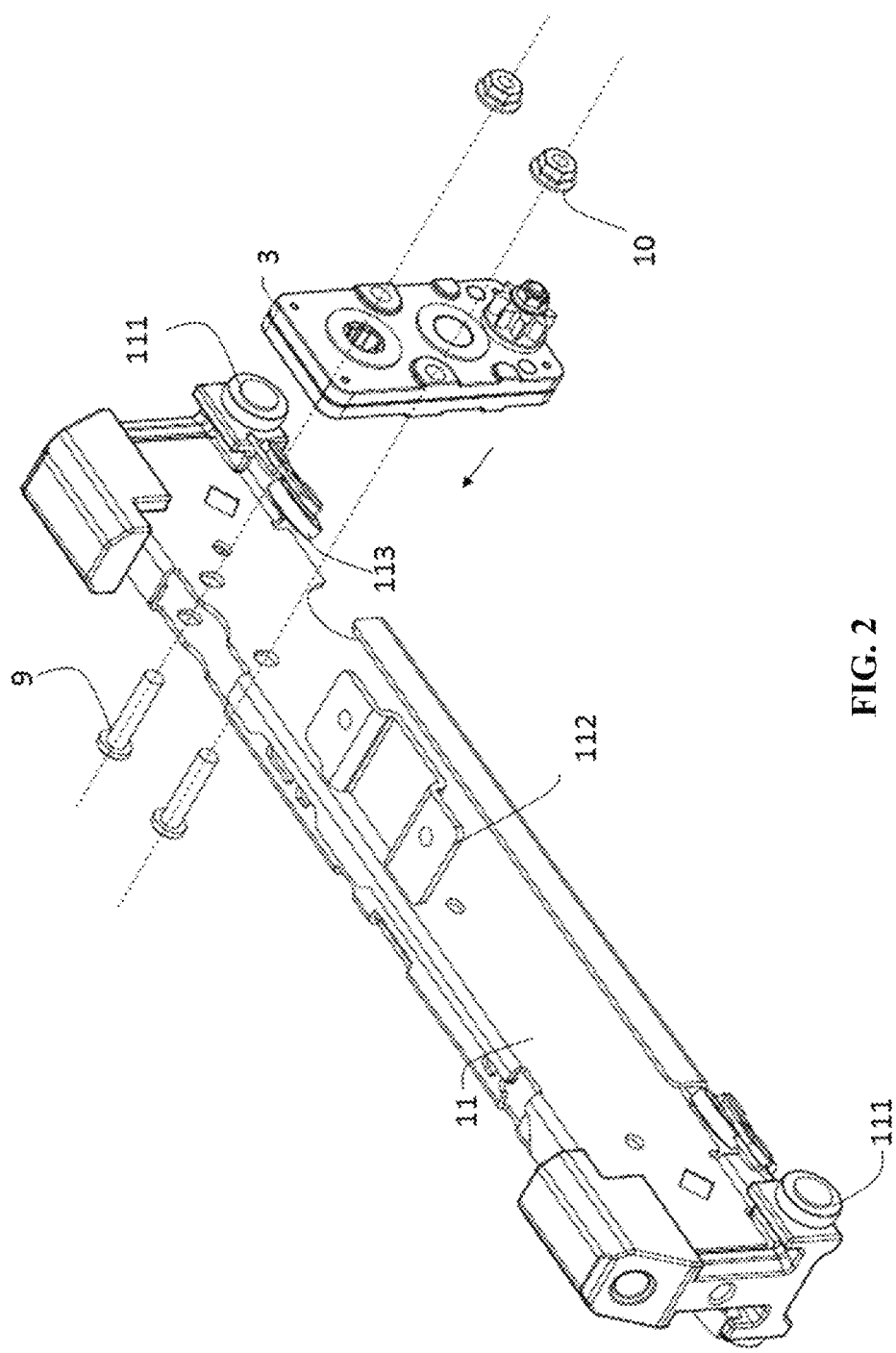
FIG. 2 is a schematic exploded view of a movable member in FIG. 1, and the movable member is provided with a gear box.
Figure 3:
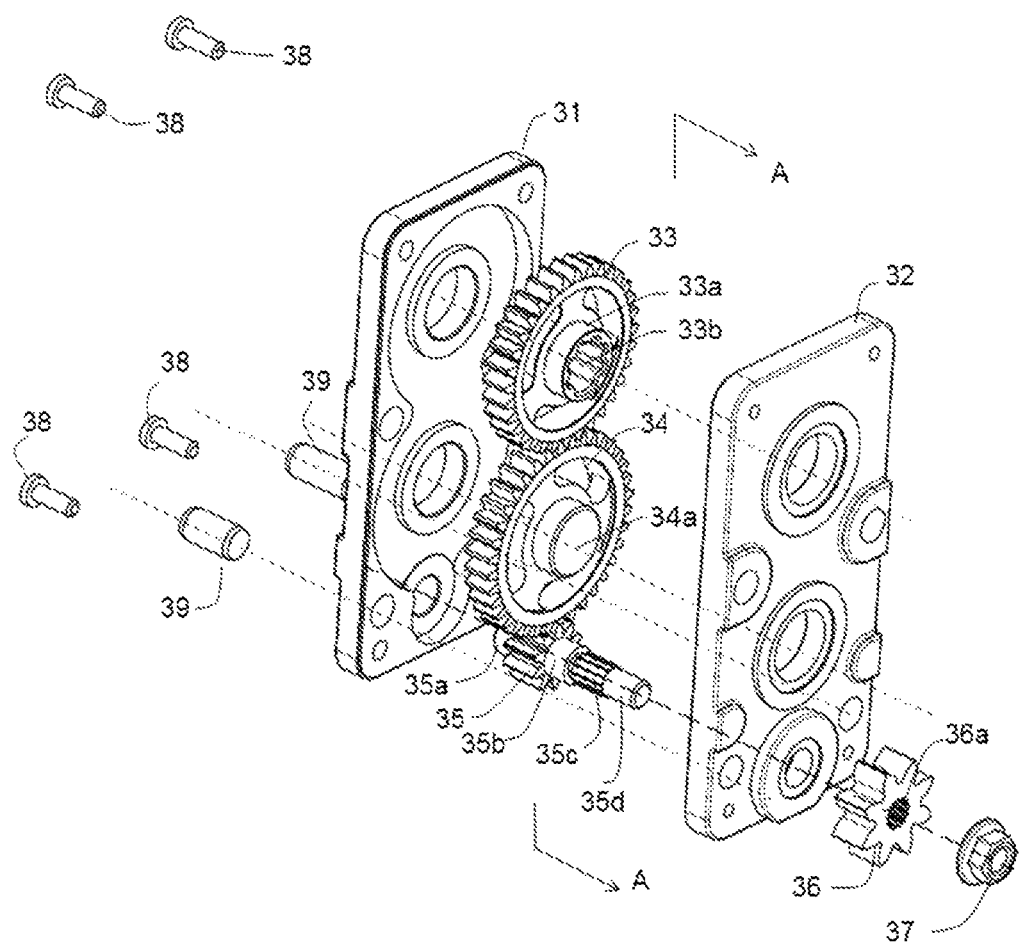
FIG. 3 is a schematic view of the gear box in FIG. 2.
Figure 4:
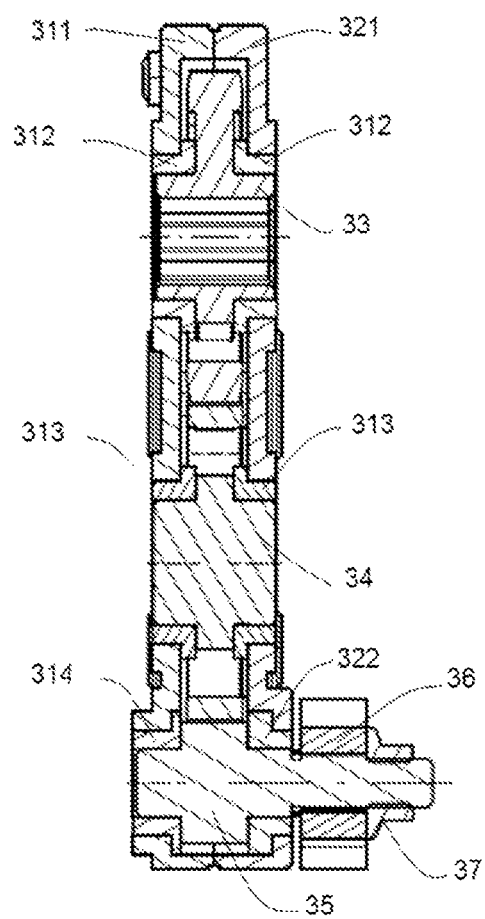
FIG. 4 is a sectional view of the gear box taken along line A-A in FIG. 2.
Figure 5:
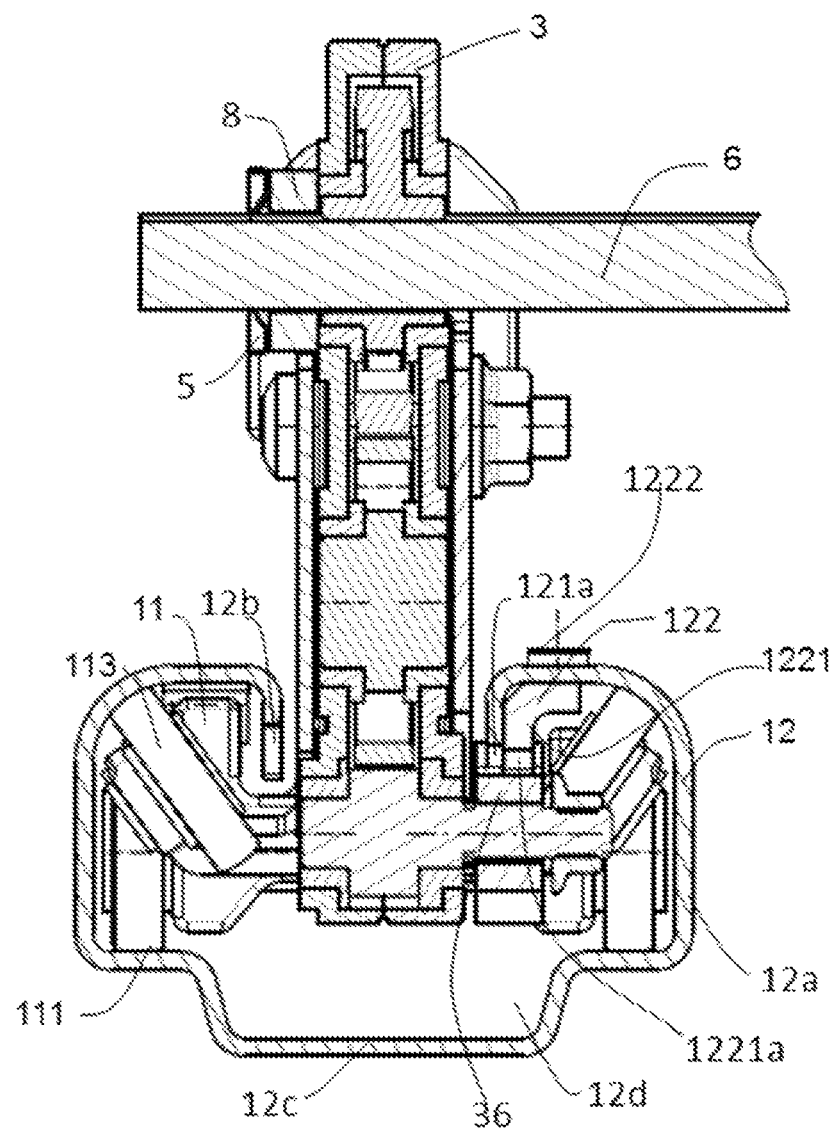
FIG. 5 is a sectional view taken along line B-B in FIG. 1.
Figure 6:
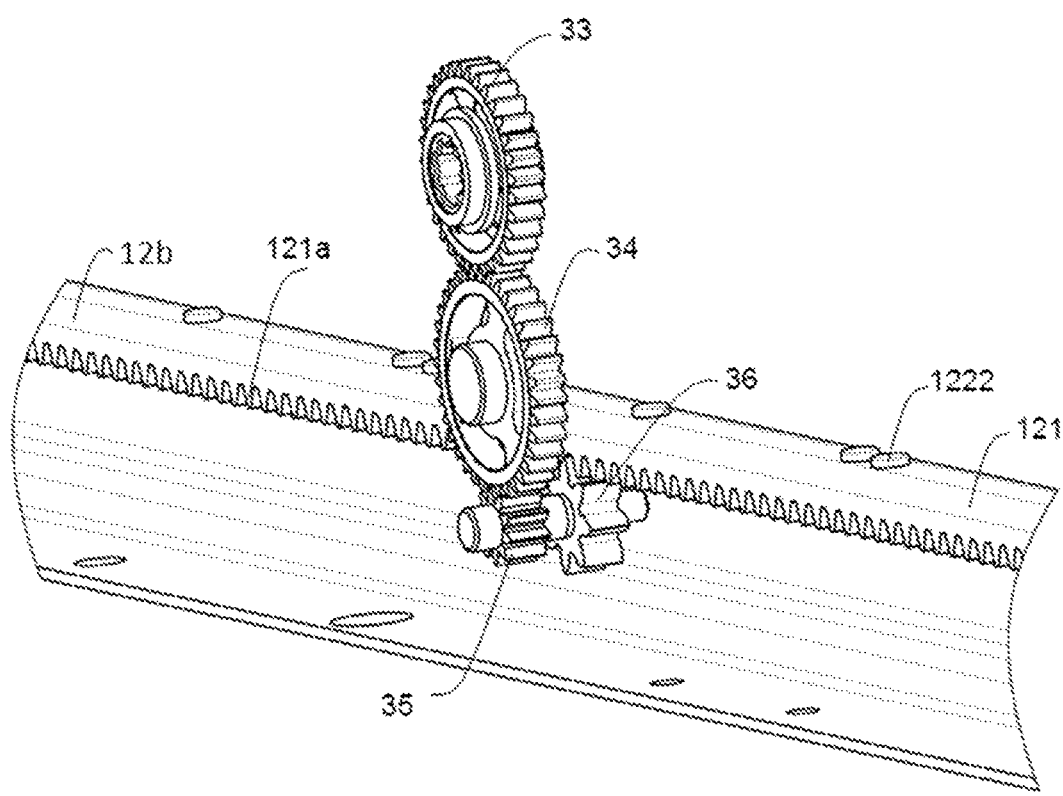
FIG. 6 is a partial enlarged view of a cooperation position between a transmission gear and a first transmission toothed belt in FIG. 1.
Figure 7:
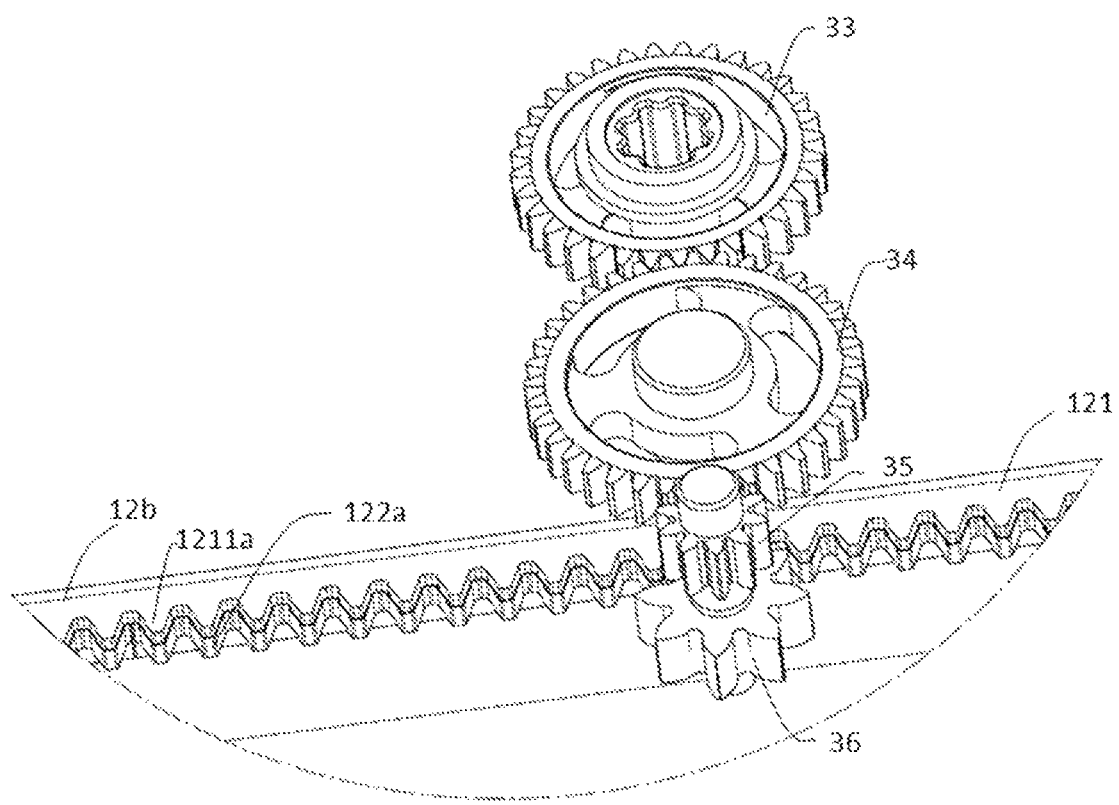
FIG. 7 is a schematic view of FIG. 6 viewed from another perspective.

Specifically as shown in FIGS. 2 to 6, FIG. 2 is a schematic exploded view of the movable member 11 in FIG. 1, and the movable member 11 is provided with a gear box 3; FIG. 3 is a schematic view of the gear box 3 in FIG. 2; FIG. 4 is a sectional view of the gear box 3 taken along line A-A in FIG. 3; FIG. 5 is a sectional view taken along line B-B in FIG. 1; FIG. 6 is a partial enlarged view of a cooperation position between a transmission gear 35 and a first transmission toothed belt 121 and between transmission gear 35 and the second transmission toothed belt 1221 in FIG. 1; and FIG. 7 is a schematic view of FIG. 6 viewed from another perspective.

As shown in FIG. 1, a groove 12*d* which extends along a length direction (that is, the front-rear direction shown in FIG. 1) is defined in the rail 12, an opening of the groove 12*d* faces upward, the rail 12 can be directly bent from a plate to form the groove 12*d*, the groove 12*d* includes a bottom wall 12*c* and side walls 12*a* located on two sides of the bottom wall 12*c*, top of each of the side walls 12*a* extends inward and downward to form a flanging 12*b*, and the "inward" herein refers to a direction close to a center of the groove 12*d*. The side wall 12*a* first extends inward to form the top wall, and the top wall extends downward to form the flanging 12*b*. In this way, the rail 12 is provided with the flanging 12*b* which is arranged along the length direction of the rail 12, gear teeth 121*a* are machined on a lower edge of the flanging 12*b*, so that the flanging 12*b* can form the required first transmission toothed belt 121. It can be understood that a length of the flanging 12*b* or the first transmission toothed belt 121 may be equal to or shorter than a length of the rail 12, which can be designed according to factors such as a driving stroke and convenient machining. In FIG. 1, the flanging 12*b* is directly formed by bending and arranged with the same length with the rail 12.

In addition, the gear teeth 121*a* of the first transmission toothed belt 121 can be machined after the flanging 12*b* is formed, or can be pre-machined on an edge of the plate and then bent to form the rail 12 with the groove 12*d* so that the gear teeth 121*a* are right in a position of the flanging 12*b* inside the groove 12*d*.

In this way, the first transmission toothed belt 121 is machined and formed when the rail 12 is machined, and it does not need to be assembled with the rail 12, and has a simple structure. In addition, the first transmission toothed belt 121 has an integral structure with the rail 12, which is also reliable. In the process of cooperating with the transmission gear 36, the first transmission toothed belt 121 is not easy to be displaced, which ensures the stability of the driving. Alternatively, it is feasible that the first transmission toothed belt 121 is arranged separately from a body of the rail 12 and then fixed to the rail 12.

In addition, in this embodiment, the rail 12 is provided with a damping strip 122 at a position of the first transmission toothed belt 121, so as to absorb the vibration caused by the meshing transmission of the transmission gear 36 and the first transmission toothed belt 121. The damping strip 122 can be made of plastic to meet the function of vibration damping.

Referring to FIGS. 5 to 7, specifically in this embodiment, the damping strip 122 is arranged on a side, facing the corresponding side wall 12*a*, of the flanging 12*b*, and the side can be defined as an inner side or a first side of the flanging 12*b*, another side is defined as an outer side or a second side of the flanging 12*b*. As shown in FIG. 1, the rail 12 in this embodiment includes the groove 12*d*, the movable member 11 is inserted into the groove 12*d* to move along the groove 12*d*, so that the second side of the flanging 12*b* faces the movable member 11, and the first side faces away from the movable member 11. The damping strip 122 is arranged on the first side, which is beneficial to fixing the damping strip 122 and is not easy to be affected by the movable member 11. As shown in FIGS. 5 and 6, the damping strip 122 can be fixed to the top wall which extends inward of the side wall 12*a* through a fastener 1222. The fastener 1222 and the damping strip 122 can be an integral structure. For example, the damping strip 122 is provided with a protrusion inserted into the top wall, and then is riveted to form the fastener 1222. Alternatively, the fastener 1222 can also be a fastening screw, etc., and the damping strip 122 can also be fixed to the rail 12 or other positions of the rail 12 by other means.

In this embodiment, a cross section of the damping strip 122 is substantially of an inverted-L shape as viewed in a direction perpendicular to the extending direction of the rail 12. A transverse portion of the inverted-L shape is used to fix to the top wall which extends inward of the side wall 12*a*. A vertical portion of the inverted-L shape forms a second transmission toothed belt 1221, and a lower edge of the second transmission toothed belt 1221 is machined to form the gear teeth 1221*a*.

As shown in FIG. 6, in this embodiment, the gear teeth 121*a* of the first transmission toothed belt 121 and the gear teeth 1221*a* of the second transmission toothed belt 1221 are arranged downward, and the transmission gear 36 is located below the first transmission toothed belt 121 and the second transmission toothed belt 1221, so that foreign matters are not easy to fall into the first transmission tooth 121 and the second transmission toothed belt 1221 with such arrangement, which can improve or even prevent the foreign matters from falling into the first transmission toothed belt 121 and the second transmission toothed belt 1221 and affecting the meshing of the transmission gear 36 with the first transmission toothed belt 121 and the second transmission toothed belt 1221, and can ensure driving effect.

It should be noted that, the first transmission toothed belt 121 and the second transmission toothed belt 1221 in this embodiment are arranged side by side and mesh with the transmission gear 36 simultaneously. As shown in FIG. 5, widths of the first transmission toothed belt 121 and the second transmission toothed belt 1221 along the direction perpendicular to the rail 12 are substantially the same with an axial length of the transmission gear 36, which is equivalent to that the first transmission toothed belt 121 and the second transmission toothed belt 1221 together form a rack which meshes with the transmission gear 36. Apparently, the gear teeth 121*a* of the first transmission toothed belt 121 and the gear teeth 1221*a* of the second transmission toothed belt 1221 are of equal size, and projections thereof along the left-right direction (the direction perpendicular to the rail 12) shown in FIG. 5 substantially overlap. In this way, the first transmission toothed belt 121 and the second transmission toothed belt 1221 which is used as the damping member are arranged side by side and mesh with the transmission gear 36 together, which not only ensures the overall strength of the transmission toothed belts, but also achieves the object of vibration damping, and is beneficial to enhancing the adaption of tolerance.

Referring to FIG. 5, the movable member 11 is provided with a rolling member, the movable member 11 is supported on the rail 12 through the rolling member, that is, a main structure of the movable member 11 is located on the rolling member, and the movable member 11 is supported by the rolling member, so that the movable member 11 specifically moves relative to the rail 12 through the rolling of the rolling member. As described above, the transmission gear 36 is located below the first transmission toothed belt 121 and the second transmission toothed belt 1221, the transmission gear 36 transmits the driving force for the movable member 11 to move, and the rolling member can improve the smoothness of the movable member 11 along the rail 12 under the driving force. Specifically, the rolling member may be a rolling bearing 111. As shown in FIG. 5, two ends of the movable member 11 are respectively provided with two rolling bearings 111, and the two rolling bearings 111 are respectively supported on two sides of the bottom wall 12c of the groove 12d.

The two rolling bearings 111 make the movement of the movable member 111 more stable. It can be known that one rolling bearing 111 is also feasible. In addition, the rolling member is not limited to the rolling bearing 111. For example, the rolling member may be a roller. However, the rolling bearing 111 has better operation stability. In addition, no rolling member is also feasible. For example, the bottom of the movable member 111 may directly move along the bottom wall 12c of the groove 12d of the rail 12 driven by the transmission gear 36, the first transmission toothed belt 121 and the second transmission toothed belt 1221. Alternatively, a structure, such as a rolling ball, provided on the bottom wall 12c of the rail 12 to facilitate the movement of the movable member 11, can also realize the smooth movement of the movable member 11 relative to the rail 12. In this embodiment, the specific structure that facilitates the relative movement of the movable member 11 and the rail 12 is not specifically limited.

In addition, as shown in FIG. 1 and FIG. 5, the movable member 11 according to this embodiment of the present application is provided with a clearance elimination bearing 113, the clearance elimination bearing 113 is in contact with the rail 12, a contact position is located above a supporting position of the rail 12, that is, the clearance elimination bearing 113 does not play the role of supporting the movable member 11 from below, and the clearance elimination bearing 113 is inclined relative to the up-down direction, two sides of the movable member 11 are respectively provided with two clearance elimination bearings 113, and the two clearance elimination bearings 113 on the two sides are arranged symmetrically about a center axial of the up-down direction. In this way, a clearance between the movable member 11 and the rail 12 in the left-right direction and the up-down direction can be eliminated, so as to ensure the transmission gear 36 to reliably mesh with the first transmission toothed belt 121 and the second transmission toothed belt 1221 and the operation can be stable without shaking after the movable member 11 is assembled with the rail 12.

The side wall 12a and the top wall of the rail 12 are connected by an arc surface in FIG. 5, and tops of the clearance elimination bearings 113 on the two sides of the movable member 13 are in contact with the arc surface on corresponding side and are rollable along the arc surface, and the clearance elimination bearings 113 on the two sides are arranged in an inverted V-shape. The arc surface is at an apex angle of the rail 12, which is beneficial to limiting the clearance elimination bearings 113. Contact surfaces of the clearance elimination bearings 113 with the rail 12 may also be an arc surface, so that the arc surface of the clearance elimination bearings 113 can be better inscribed on the contact surface of the rail 12, and can always maintain a tangent point, so as to ensure the adaptability of manufacturing tolerance and improve the smoothness of sliding.

Referring to FIGS. 3 to 5, the movable member 11 according to the embodiment of the present application is provided with a gear box 3, and the transmission gear 36 is arranged in the gear box 3. The gear box 3 specifically includes a housing, which is formed by the splicing of a first housing assembly 31 and a second housing assembly 32, and the first housing assembly 31 and the second housing assembly 32 are fixedly connected by a screw 38 and a pin 39. An input gear 33, an intermediate gear 34 and an output gear 35 are provided inside the gear box 3, the transmission gear 36 is arranged outside the housing, and the output gear 35 inside the gear box 3 is coaxially connected to the transmission gear 36, that is, the transmission gear 36 can rotate synchronously with the output gear 35. As shown in FIG. 4, the first housing assembly 31 includes a first housing 311, the second housing assembly 32 includes a second housing 321, two housing assemblies further include a shaft sleeve corresponding to the respective gear, and the first housing 311 and the second housing 321 respectively define a hole for mounting the shaft sleeve.

The shaft sleeve in this embodiment specifically includes two first shaft sleeves 312, two second shaft sleeves 313, a third shaft sleeve 314 and a fourth shaft sleeve 322, and the shaft sleeves can all be self-lubricating bearings. Two bosses 33a are respectively provided on two sides of the input gear 33, the two first shaft sleeves 312 are mounted on the two bosses 33a. Two bosses 34a are respectively provided on two sides of the intermediate gear 34, the two second shaft sleeves 313 are mounted on the two bosses 34a, a boss 35a and a boss 35b are respectively provided on two sides of the output gear 35, and the third shaft sleeve 314 and the fourth shaft sleeve 322 are respectively mounted on the boss 35a and the boss 35b. The side, where the boss 35b is provided, of the output gear 35 needs to be connected to the transmission gear 36. As shown in FIG. 4, of a radial flange of the fourth shaft sleeve 322 may be thicker than the third shaft sleeve 314, so as to improve the strength. The above shaft sleeves can play the role of noise reduction and lubrication when matched with the gear shaft.

The above input gear 33 defines a first shaft hole 33b, the driving portion includes a motor 2 and a transmission rod 6, the motor 2 drives the transmission rod 6 to rotate, and the transmission rod 6 is inserted to the two gear boxes 3 of the two sliding rail assemblies 1 simultaneously, which is specifically inserted into the first shaft holes 33b of the input gears 33 of the two gear boxes 3 to drive the two input gears 33 to rotate synchronously. The first shaft hole 33b may be a special-shaped hole, a special-shaped hole is also defined in the motor 2, the transmission rod 6 may be arranged as a special-shaped shaft, that is, a cross section of the transmission rod 6 is special-shaped, which can prevent the transmission rod 6 from rotating relative to the first shaft holes 33b and the motor 2, so that the motor 2 can drive the transmission rod 6 to rotate, and the transmission rod 6 can drive the transmission gear 36 to rotate. The special-shaped here may be irregular shape or regular polygon. After the transmission rod 6 passes through the gearbox 3, it can be limited by a gasket 8 and a limiting spring clip 5 to prevent being separated along an axial direction. The limit spring clip 5 can also be a circlip.

The output gear 35 meshes with the intermediate gear 34, the intermediate gear 34 meshes with the output gear 35, and the output gear 35 meshes with the transmission gear 36, so that gear box 3 and the transmission rod 6 act as a transmission system between the motor 2 and the transmission gear 36 to realize the transmission of the driving force. The gearbox 3 is provided with the input gear 33, the intermediate gear 34 and the output gear 35. The gearbox 3 is a two-stage speed-increasing transmission, and a speed-increasing ratio of the input gear 33 to the output gear 35 ranges from 1:2 to 1:8.

As shown in FIG. 5, the output gear 35 is provided with a gear shaft. A radial size of the gear shaft may be arranged smaller than that of the boss 35b, the gear shaft protrudes outward from the boss 35b out of the housing of the gear box 3, the transmission gear 36 defines a second shaft hole 36a, the gear shaft is inserted into the second shaft hole 36a and circumferentially limits rotation. Similarly, the gear shaft and the second shaft hole 36a are arranged to be special-shaped, or the gear shaft can be in spline fit with a hole wall of the second shaft hole 36a. In FIG. 3, a special-shaped section 35c is provided on the gear shaft, which can limit the relative rotation between the gear shaft of the output gear 35 and the transmission gear 36, so as to drive the transmission gear 36 to rotate synchronously. In addition, the sliding rail transmission device further includes an axial limiting member, the gear shaft passes through the second shaft hole 36a and is connected to the axial limiting member, and the axial limiting member limits the transmission gear 36 from being axially separated from the gear shaft. The axial limiting member may be a nut 37 shown in FIG. 5, the gear shaft can be provided with a threaded section 35d, the threaded section 35d is connected to the special-shaped section 35c, and the nut 37 can be just screwed into the threaded section 35d of the gear shaft. Alternatively, the axial limiting member may have other structures, such as a circlip. In this embodiment, the boss 35a and the boss 35b of the output gear 35, as well as the gear shaft and the output gear 35 are an integral structure with good strength to transmit power. Alternatively, a separate structure is also feasible.

In this embodiment, the movable member 11 defines an accommodating portion. As shown in FIG. 2, the movable member 11 defines an inner chamber, the movable member 11 may be spliced by two separate portions, or the movable member 11 may have an integral structure in the shape of housing, and the inner chamber of the housing forms the accommodating portion. It can be understood from the FIG. 1 that part of the gear box 3 is located in the accommodating portion of the movable member 11, and the gear box 3 can be inserted into the accommodating portion from top to bottom and be fixed to the movable member 11 by the bolt 9 and the nut 10 after insertion. Another part of the gear box 3 protrudes upward out from the movable member 11, the first shaft hole 33a of the input gear 33 corresponds to the protruding part, that is, the first shaft hole 33a is located above the movable member 11. Two ends of the transmission rod 6 can pass through the housings of the two gear box 3 and be inserted into the two first shaft holes 33a. The movable member 11 is arranged in this way to facilitate the connection between the transmission rod 6 and the input gear 33. Alternatively, the gear box 3 is integrally located in the movable member 11, and the transmission rod 6 also needs to pass through the housing of the movable member 11 in this case.

As shown in FIG. 1, the sliding rail transmission device according to the embodiment of the present application further includes a bracket 4, the movable members 11 of the two sliding rail assemblies 1 are connected by the bracket 4, each movable member 11 may be provided with a fixing plate 112, and two ends of the bracket 4 are fixed to the fixing plate 112, specifically by a screw 7. The motor 2 is arranged on the bracket 4. The two sliding rail assemblies 1 are connected by the bracket 4, so that the two sliding rail assemblies 1 form a whole, which can improve the rigidity, stability and synchronization of the movement of the device. In addition, the bracket 4 can be used as a mounting member of the motor 2, which can reduce the shaking phenomenon when the motor 2 is started and locked. Moreover, the bracket 4 facilitates the motor 2 driving the transmission rod 6, and the motor 6 is arranged at or near a middle position of the bracket 4, so as to transmit the power to the transmission rod 6 more evenly. In FIG. 1, a through hole is defined in the bracket 4, the transmission rod 6 passes through the through hole and the special-shaped hole of the motor, and the bracket 4 plays the role of supporting and stabilizing the transmission rod 6. Specifically, the through hole is substantially in the middle of the transmission rod 6. The bracket 4 can be formed by welding and assembling a pipe fitting and a sheet metal bracket, which is beneficial to arranging and assembling a required bracket structure according to the actual needs, and has good flexibility, which is as shown in FIG. 1. Alternatively, the bracket 4 can also be integrally made of sheet metal or plastic.

The driving process in the embodiment is as follows: the motor 2 starts and drives the transmission rod 6 to rotate, the transmission rod 6 drives the input gear 33 to rotate, the input gear 33 drives the intermediate gear 34 to rotate, the intermediate gear 34 drives the output gear 35 to rotate, the output gear 35 drives the transmission gear 36 to rotate, and the transmission gear 36 meshes with the gear teeth 121a and the gear teeth 1221a, so as to rotate relative to the first transmission toothed belt 121 and the second transmission toothed belt 1221, and finally the two movable members 11 are driven to move relative to the respective corresponding rail 12 along the front-rear direction.

The two sliding rail assemblies 1 are described as an example in this embodiment. It can be seen that one or more sliding rail assembly is also feasible. When two or more sliding rail assemblies 1 are provided, the driving portion can drive all the sliding rail assemblies 1 synchronously through one transmission rod 6, so as to ensure the synchronization of the movement of the movable member 11. In addition, taking the example that the groove 12d is defined in the rail 12 and the movable member 11 is inserted into the groove 12d in FIG. 1, it can be seen that the cooperation structure of the movable member 11 and the rail 12 is not limited to this. For example, a chute with an opening facing one side is provided on the two sides of the rail 12, and the two sides of the movable member are clamped and slidable in the chute, as long as the rail 12 is provided with the first transmission toothed belt 121 and the second transmission toothed belt 1221 with teeth 121a facing down.

A vehicle is provided according to the embodiment of the present application, which includes a seat and a sliding rail transmission device, a rail of the sliding rail transmission device is fixed on a vehicle body, the movable member 11 is connected to the seat, so that the seat is driven to move back and force when the movable member 11 moves. The front-rear direction of the rail 12 and the extending direction are a front-rear direction of the vehicle, and the left-right direction of the rail 12 is a left-right direction of the vehicle. The vehicle has the same technical effect as the above embodiment and will not be repeated. The seat here can be either a front seat or a rear seat. Especially when the sliding rail transmission device is applied to the adjustment of the rear seat for a relatively long distance, the moving cooperation mode of the rail 12 and the movable member 11, and the driving mode of the transmission gear 36 with the first transmission toothed belt 121 and the second transmission toothed belt 1221 are beneficial to the stable driving under the long slide rail.

Principles and embodiments of the present application are described herein through specific examples. Description of the above embodiments is merely used to facilitate understanding the method and concept of the present application. It should be noted that several improvements and modifications can be made to the present application by those skilled in the art without departing from the principles of the present disclosure. These improvements and modifications shall fall within the scope of the claims of the present application.

The invention claimed is:

1. A sliding rail transmission device, comprising:
a driving portion and at least one sliding rail assembly,
wherein the sliding rail assembly comprises a rail and a movable member, the rail comprises a flanging which extends downward, the flanging forms a first transmission toothed belt, and the rail comprises a damping strip at a position of the first transmission toothed belt, the damping strip forms a second transmission toothed belt, the first transmission toothed belt and the second transmission toothed belt are arranged side by side, the movable member comprises a transmission gear, the transmission gear is arranged below the first transmission toothed belt and the second transmission toothed belt, and the transmission gear meshes with the first transmission toothed belt and the second transmission toothed belt simultaneously; and the driving portion drives the transmission gear to rotate, so as to drive the movable member to move along the rail.

2. The sliding rail transmission device according to claim 1, wherein a groove is defined in the rail, the groove comprises a bottom wall and side walls located on two sides of the bottom wall, and a top of at least one of the side walls extends inward and downward to form the flanging.

3. The sliding rail transmission device according to claim 2, wherein at least part of the movable member is inserted into the groove and is configured to move along the bottom wall of the groove.

4. The sliding rail transmission device according to claim 3, wherein a rolling bearing is provided on one side or two sides of the movable member, the movable member is supported on the rail through the rolling bearing, and the movable member rolls through the rolling bearing to move relative to the rail.

5. The sliding rail transmission device according to claim 3, further comprises:
two sliding rail assemblies arranged side by side, the movable member of each sliding rail assembly comprises two gear boxes, each gear box comprises an input gear and an output gear, the output gear is coaxially connected to the transmission gear, and the input gear defines a first shaft hole;
the driving portion comprises a motor and a transmission rod, the motor drives the transmission rod to rotate, and the transmission rod is inserted to two first shaft holes of the input gears of the two gear boxes simultaneously to drive the two input gears to rotate synchronously.

6. The sliding rail transmission device according to claim 2, wherein a rolling bearing is provided on one side or two sides of the movable member, the movable member is supported on the rail through the rolling bearing, and the movable member rolls through the rolling bearing to move relative to the rail.

7. The sliding rail transmission device according to claim 2, further comprising:
two sliding rail assemblies arranged side by side, the movable member of each sliding rail assembly comprises two gear boxes, each gear box of the two gear boxes comprises an input gear and an output gear, the output gear is coaxially connected to the transmission gear, and the input gear defines a first shaft hole;
the driving portion comprises a motor and a transmission rod, the motor drives the transmission rod to rotate, and the transmission rod is inserted to two first shaft holes of the input gears of the two gear boxes simultaneously to drive the two input gears to rotate synchronously.

8. The sliding rail transmission device according to claim 1, wherein the second transmission toothed belt is located on an inner side of the flanging.

9. The sliding rail transmission device according to claim 8, wherein a rolling bearing is provided on one side or two sides of the movable member, the movable member is supported on the rail through the rolling bearing, and the movable member rolls through the rolling bearing to move relative to the rail.

10. The sliding rail transmission device according to claim 8, further comprises:
two sliding rail assemblies arranged side by side, the movable member of each sliding rail assembly comprises two gear boxes, each gear box comprises an input gear and an output gear, the output gear is coaxially connected to the transmission gear, and the input gear defines a first shaft hole;
the driving portion comprises a motor and a transmission rod, the motor drives the transmission rod to rotate, and the transmission rod is inserted to two first shaft holes of the input gears of the two gear boxes simultaneously to drive the two input gears to rotate synchronously.

11. The sliding rail transmission device according to claim 1, wherein the second transmission toothed belt is made of plastic.

12. The sliding rail transmission device according to claim 11, wherein a rolling bearing is provided on one side or two sides of the movable member, the movable member is supported on the rail through the rolling bearing, and the movable member rolls through the rolling bearing to move relative to the rail.

13. The sliding rail transmission device according to claim 11, further comprises:
two sliding rail assemblies arranged side by side, the movable member of each sliding rail assembly comprises two gear boxes, each gear box comprises an input gear and an output gear, the output gear is coaxially connected to the transmission gear, and the input gear defines a first shaft hole;
the driving portion comprises a motor and a transmission rod, the motor drives the transmission rod to rotate, and the transmission rod is inserted to two first shaft holes of the input gears of the two gear boxes simultaneously to drive the two input gears to rotate synchronously.

14. The sliding rail transmission device according to claim 1, wherein a rolling bearing is provided on one side or two sides of the movable member, the movable member is supported on the rail through the rolling bearing, and the movable member rolls through the rolling bearing to move relative to the rail.

15. The sliding rail transmission device according to claim 14, wherein two clearance elimination bearings are provided on two sides of the rail, the two clearance elimination bearings are in contact with the rail, contact positions of the two clearance elimination bearings with the rail are located above a supporting position of the movable member, the two clearance elimination bearings are inclined relative to an up-down direction, and the two clearance elimination bearings on the two sides of the movable member are arranged symmetrically relative to the up-down direction;
a groove is defined in the rail, the groove comprises a bottom wall and side walls located on two sides of the bottom wall, tops of the side walls extend inward to form top walls, an arc surface transitions between each of the top walls and a corresponding side wall of the side walls, and the two clearance elimination bearings are in contact with the corresponding arc surface and are rollable along the corresponding arc surface.

16. The sliding rail transmission device according to claim 1, wherein the sliding rail transmission device comprises two sliding rail assemblies arranged side by side, the movable member of each sliding rail assembly comprises two gear boxes, each gear box of the two gear boxes comprises an input gear and an output gear, the output gear is coaxially connected to the transmission gear, and the input gear defines a first shaft hole;

the driving portion comprises a motor and a transmission rod, the motor drives the transmission rod to rotate, and the transmission rod is inserted to two first shaft holes of the input gears of the two gear boxes simultaneously to drive the two input gears to rotate synchronously.

17. The sliding rail transmission device according to claim 16, wherein the output gear is provided with a gear shaft, the gear shaft protrudes out of a housing of the gear box, the transmission gear comprises a second shaft hole, the gear shaft is inserted into the second shaft hole and circumferentially limits rotation; the sliding rail transmission device further comprises an axial limiting member, the gear shaft passes through the second shaft hole and is connected to the axial limiting member, and the axial limiting member limits the transmission gear from being axially separated from the gear shaft.

18. The sliding rail transmission device according to claim 16, further comprising a bracket, wherein two movable members of the two sliding rail assemblies are connected by the bracket, and the motor is arranged on the bracket.

19. The sliding rail transmission device according to claim 16, wherein the movable member defines an accommodating portion, a part of the gear box is located in the accommodating portion, another part of the gear box protrudes upward out from the movable member, the second shaft hole of the input gear is located above the movable member, and two ends of the transmission rod are inserted into the two second shaft holes respectively.

20. A vehicle, comprising a seat, and further comprising the sliding rail transmission device according to claim 1, wherein the movable member is connected to the seat.

* * * * *